United States Patent [19]
Mukaiyama et al.

[11] Patent Number: 5,644,374
[45] Date of Patent: Jul. 1, 1997

[54] VARIABLE FOCUS TYPE EYESIGHT CORRECTING APPARATUS

[75] Inventors: Hiroyuki Mukaiyama; Kazutoshi Kato; Akira Komatsu, all of Suwa, Japan

[73] Assignee: Seiko Epson Corporation, Tokyo-to, Japan

[21] Appl. No.: 410,902

[22] Filed: Mar. 27, 1995

Related U.S. Application Data

[63] Continuation of Ser. No. 129,101, filed as PCT/JP93/00121, Feb. 2, 1993, abandoned.

[30] Foreign Application Priority Data

Feb. 3, 1992 [JP] Japan .................. 4-17715

[51] Int. Cl.$^6$ .................. G02C 7/06; G02C 7/08
[52] U.S. Cl. .................. 351/169; 351/172
[58] Field of Search .................. 351/168, 169, 351/170, 171, 172; 359/708

[56] References Cited

U.S. PATENT DOCUMENTS

| | | | |
|---|---|---|---|
| 3,305,294 | 2/1967 | Alvarez | 351/169 |
| 3,485,556 | 12/1969 | Naujokas | 351/169 |
| 3,507,565 | 4/1970 | Alvarez et al. | 351/169 |
| 3,583,790 | 6/1971 | Baker | 351/169 |

*Primary Examiner*—Scott J. Sugarman
*Attorney, Agent, or Firm*—Ladas & Parry

[57] ABSTRACT

A variable focus type eyesight correcting apparatus in which a plurality of optical lenses are superimposed on each other and in which a refracting power is changed by relatively sliding the lenses in the direction of the superimposed surfaces, achieves a reduction of astigmatism, assurance of uniform refracting power, prevention of diffused reflection, which could be caused if a plurality of refractive surfaces are present, and miniaturization of lens system. When a change of astigmatism in each constituent lens in the variable focus type eyesight correcting apparatus is expressed by contours spaced at intervals of arbitrary diopter, the contours are arranged to be substantially linear and parallel to the principal meridian. The astigmatism becomes absent and the refracting power becomes constant in the region where the eyeglass lenses of the present invention are superimposed on each other, whereby the lenses of the invention can have the optical performance identical to that of single focal lens.

5 Claims, 14 Drawing Sheets

(UNIT: DIOPTER)

FIG. 8A  FIG. 8B (UNIT: DIOPTER)

VARIABLE FOCUS TYPE EYESIGHT CORRECTING APPARATUS

This is a continuation of application Ser. No. 08/129,101, filed on Sep. 30, 1994, now abandoned, and International Application PCT/JP93/00121 filed on Feb. 2, 1993, and which designated the U.S.

TECHNICAL FIELD

The present invention relates to a variable focus type eyesight correcting apparatus, and more particularly to a variable focus type eyesight correcting apparatus improved in optical performance of lenses employed therein.

BACKGROUND ART

The presbyopia is generally corrected by using single-focal lenses, double-focal lenses, progressive multi-focal lenses, or the like. With single-focal lenses, however, replacement or putting-off of eyeglasses for far object is troublesome, or with progressive multi-focal lenses the visual field is narrow in each of far, middle and near ranges because of their structure, inconveniently causing a problem of shaking or distortion.

In order to solve such problems, there have heretofore been studied eyeglasses having a variable focus mechanism. For example, a focal-length variable lens disclosed in Japanese Patent Publication No. 58-50339 employs the liquid crystal. Also, an eyesight correcting apparatus disclosed in Japanese Laid-open Patent Application No. 63-254415 is so arranged that a plurality of optical lenses are laid one over another and slid relative to each other in the direction of laid surfaces to change the refracting power. However, the former focal-length variable lens using the liquid crystal has a lot of problems, such as a slow reaction speed, a variation in index of refraction of liquid crystal with temperature change, a narrow variable range of focal length, an aberration intrinsic to the liquid crystal, which plastics or glasses never have, and so on.

Figure 1:
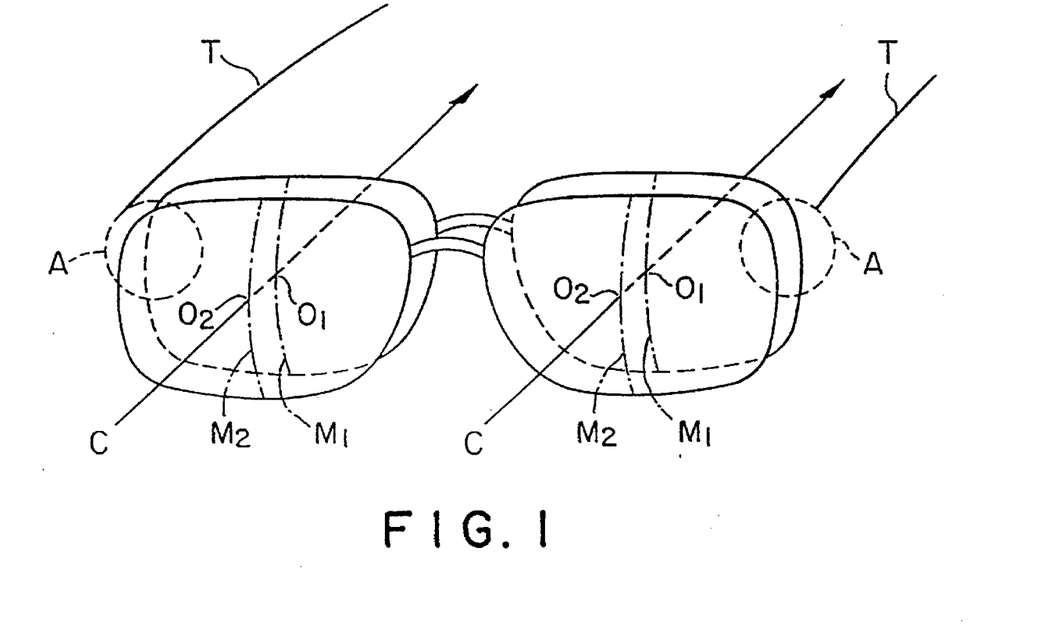
FIG. 1 is a perspective view to show variable focus type eyeglasses with slide mechanism.

Then, attention is focused on the latter variable focus type eyeglasses, in which two progressive multi-focal lenses are arranged along the optical axis such that a change in refracting power of one lens is opposite to that of the other, as shown in FIG. 1, and in which the lenses are relatively slid in the direction of principal meridian to change the focal length thereof. In the specification the variable focus type eyesight correcting apparatus, in which a plurality of optical lenses are laid one over another and slid relative to each other in the direction of laid surfaces to change the refracting power, will be generally referred to as "variable focus type eyeglasses with slide mechanism."

Figure 2:
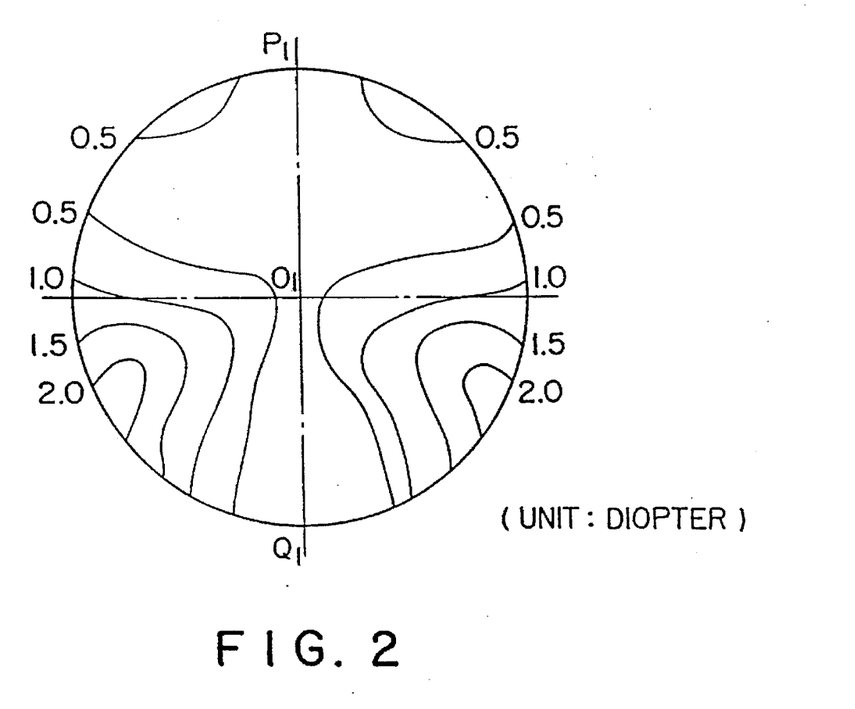
FIG. 2 is an aberration diagram of a conventional progressive multi-focal lens (on the eye ball side)
Figure 3:
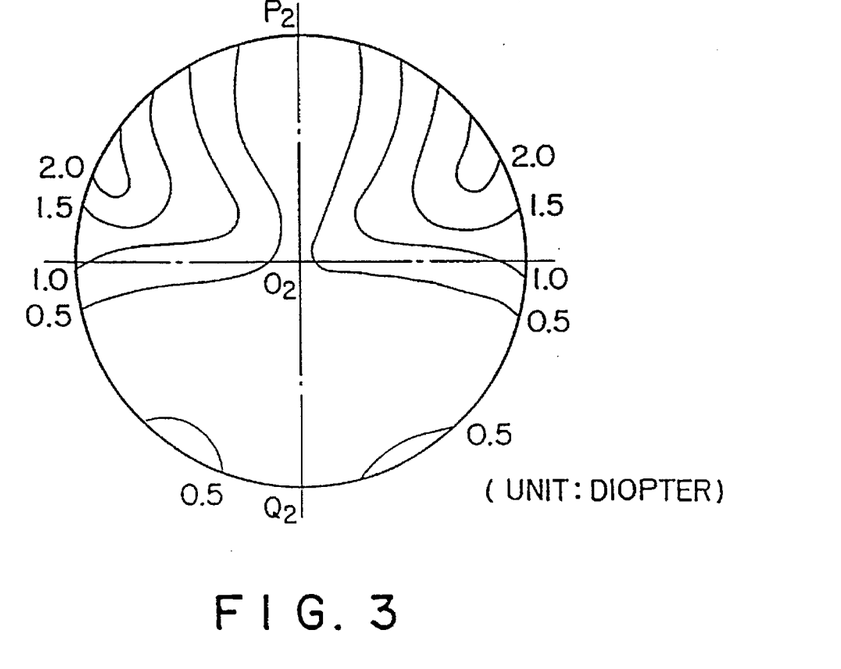
FIG. 3 is an aberration diagram of a conventional progressive multi-focal lens (on the object side)
Figures 4A, 4B:
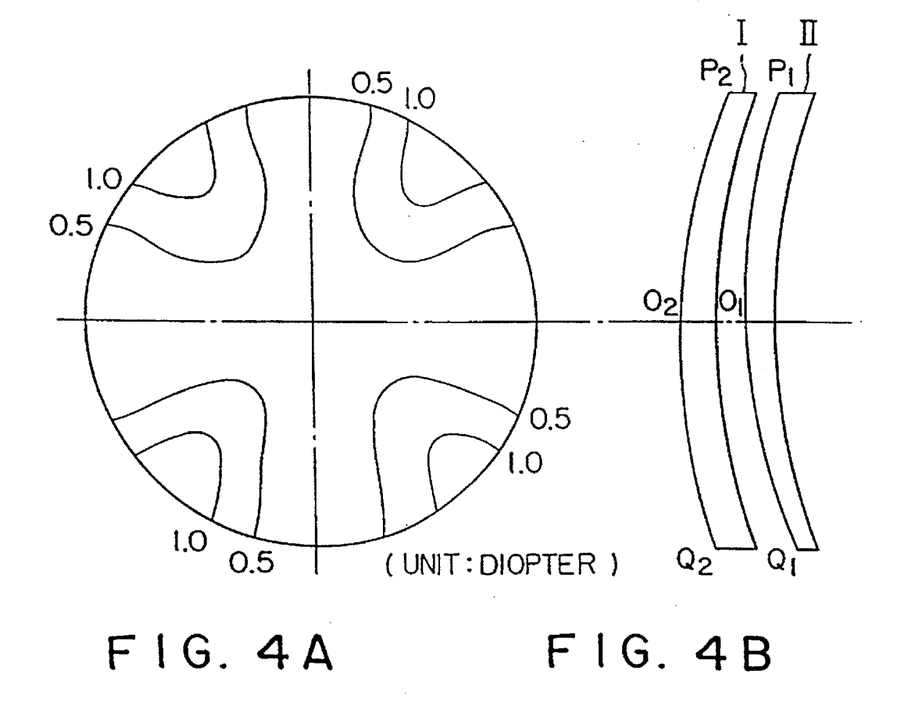
FIGS. 4(A) and 4(B) are an aberration diagrams of conventional variable focus type eyeglasses with slide mechanism.
Figures 5A, 5B:
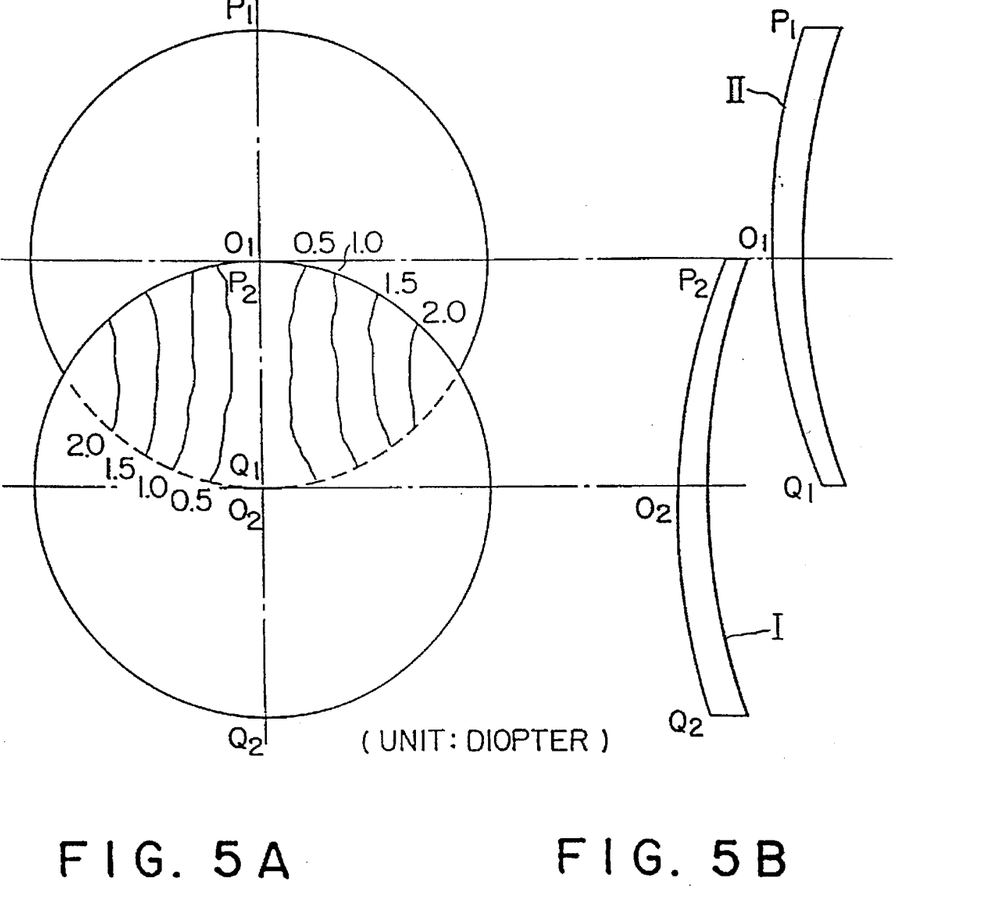
FIGS. 5(A) and 5(B) are an aberration diagrams of the conventional variable focus type eyeglasses with slide mechanism when constituent lenses are slid relative to each other.

However, if conventional progressive multi-focal lenses are employed for "variable focus type eyeglasses with slide mechanism", astigmatisms which the progressive multi-focal lenses respectively have cannot completely cancel each other, and thus it is hardly possible to secure as wide visual field as a single-focal lens has. FIG. 2 and FIG. 3 are drawings to show astigmatisms of two progressive multi-focal lenses, which constitute a lens set for one eye in "variable focus type eyeglasses with slide mechanism." FIG. 2 shows a lens on the eye ball side and FIG. 3 the other lens on the object side. When the two lenses are arranged such that $O_1$ and $O_2$, $P_1$ and $P_2$, and, $Q_1$ and $Q_2$ are respectively superimposed one over the other, the superimposed region of two progressive multi-focal lenses have the total astigmatism as shown in FIGS. 4A and 4B, which shows that the astigmatisms of the two lenses cannot cancel each other so as to narrow the visual field. It is known that a man cannot have a distinct vision in the range where the astigmatism is over 1 diopter. If the progressive multi-focal lens on the object side is slid from the state of FIGS. 4B in parallel with the principal meridian until $O_1$ in FIG. 2 and $P_2$ in FIG. 3 become laid one over the other, to change the refracting power of overlapping region between the two progressive multi-focal lenses, the range where the astigmatism is within 1 diopter becomes further narrower as shown in FIG. 5A.

Figure 6:
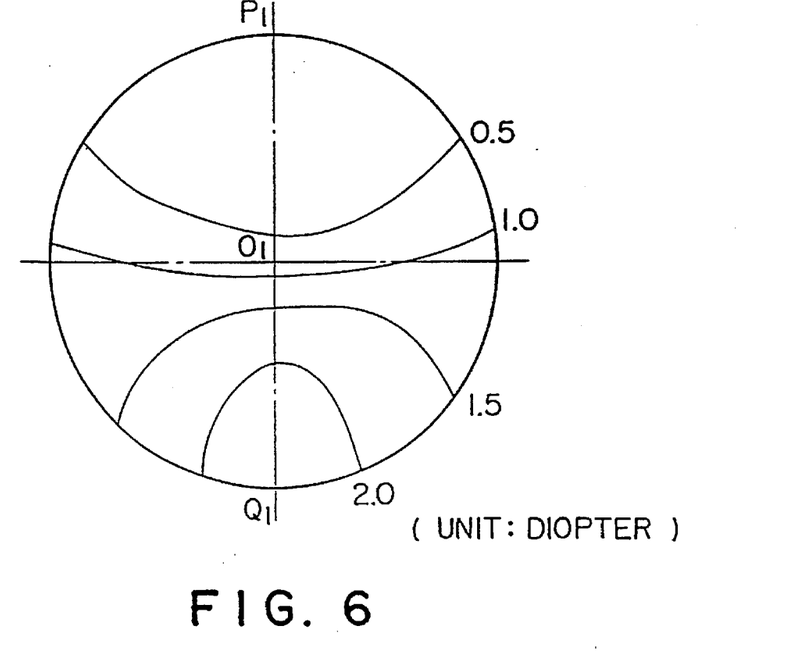
FIG. 6 is a diagram of power distribution of a conventional progressive multi-focal lens (on the eye ball side)
Figure 7:
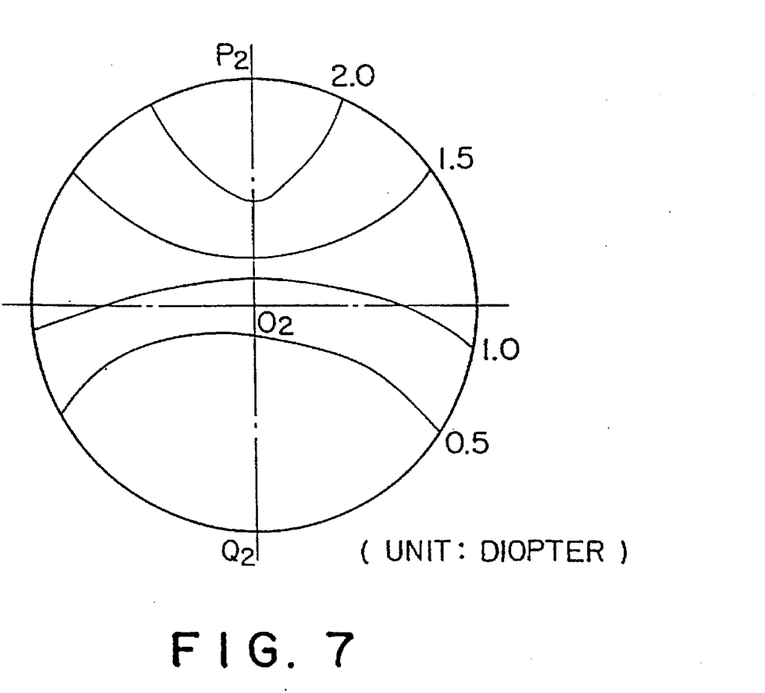
FIG. 7 is a diagram of power distribution of a conventional progressive multi-focal lens (on the object side)
Figure 8A:
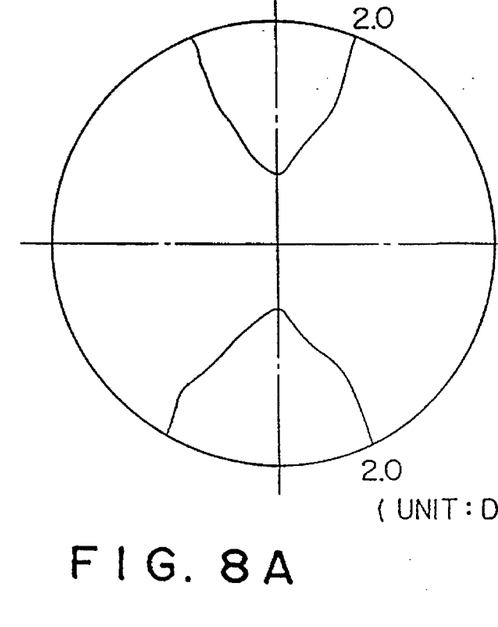
FIGS. 8(A) and 8(B) are diagrams of power distribution of conventional variable focus type eyeglasses with slide mechanism.
Figure 8B:
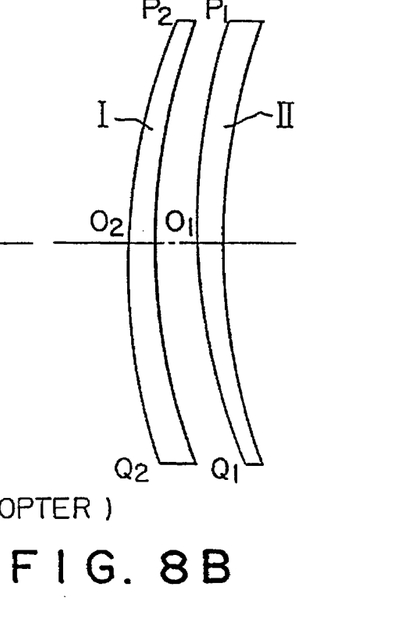

The "variable focus type eyeglasses with slide mechanism" using the conventional progressive multi-focal lenses do not have only the problem of astigmatism but also a problem in power distribution. Namely, FIG. 6 shows a power distribution in a progressive multi-focal lens on the eye ball side, and FIG. 7 shows a power distribution in a progressive multi-focal lens on the object side. When the two lenses are superimposed under the same condition as in FIG. 4A, a distribution of total refracting power is not constant in the overlapping region between the two progressive multi-focal lenses, as shown in FIG. 8A. When a user wears such glasses, the user will feel unpleasant with shake or distortion of image. In addition, a part of region could not suit the prescription of the user, resulting in failure of assuring a good visual field.

Also, in order to make the "variable focus type eyeglasses with slide mechanism" smaller, a clearance between the two superposed optical lenses should better be made as short as possible, though a refractive surface on the eye ball side in the optical lens disposed on the object side could contact with a refractive surface on the object side in the optical lens disposed on the eye ball side. After the lenses are repeatedly slid in this state, contacting surfaces or points will have flaws very easily, which was another problem.

It is, therefore, an object of the present invention to provide an eyeglass lens for "variable focus type eyeglasses with slide mechanism", which can solve the problems as described above.

SUMMARY OF THE INVENTION

An eyeglass lens of the present invention is an optical lens system used in a variable focus type eyesight correcting apparatus in which a plurality of optical lenses are superimposed one over another such that principal meridians thereof are coincident with each other and in which a refracting power of the apparatus is changed by relatively sliding the lenses along the principal meridians, which is characterized in that at least one of two refractive surfaces of each said optical lens has a region in which a radius of curvature progressively changes along said principal meridian and in that when a change of astigmatism in each said optical lens is expressed by contours spaced at intervals of arbitrary diopter the lens is arranged such that the contours are substantially parallel to said principal meridian as being substantially linear.

An eyeglass lens of the present invention is characterized in that when a change of refractive power in each said optical lens is expressed by contours spaced at intervals of arbitrary diopter the contours are substantially perpendicular to the principal meridian as being substantially linear.

An eyeglass lens of the present invention is characterized in that if a region progressively changing a radius of curvature therein is present on a refractive plane on the object side of one of said optical lenses a prism is inserted such that a base thereof is located on a side with smaller radius of curvature in said region.

An eyeglass lens of the present invention is characterized in that if a region progressively changing a radius of curvature therein is present on a refractive surface on the eye ball side of one of said optical lenses a prism is inserted such that a base thereof is located on a side with larger radius of curvature in said region.

An eyeglass lens of the present invention is characterized in that when said optical lenses are superimposed one over another a clearance between superimposed surfaces is filled with a fluid having an arbitrary index of refraction.

An eyeglass lens of the present invention is characterized in that when said optical lenses are superimposed on each other, when a radius of curvature of a refractive plane on the eye ball side out of two superimposed refractive surfaces is r1 (mm), and when a radius of curvature of a refractive surface on the object side is r2 (mm), the following relation holds:

$$|1/r1 - 1/r2| \leq 0.003$$

By using the eyeglass lenses of the present invention in variable focus type eyeglasses with slide mechanism, a variable focus type eyesight correcting apparatus may be attained, which has a constant refracting power in the region where the eyeglass lenses of the present invention are superimposed on each other and which has no astigmatism so as to assure a visual field equivalent to that of single-focal lens.

By using the eyeglass lenses of the present invention in variable focus type eyeglasses with slide mechanism, the lens system therein may be miniaturized.

By using the eyeglass lenses of the present invention in variable focus type eyeglasses with slide mechanism, the eyeglasses are free of flaws, which could be caused when the optical lenses rub against each other, and free of diffused reflection, which could be caused by presence of plural refractive surfaces.

BEST MODE FOR CARRYING OUT THE INVENTION

Figure 9:
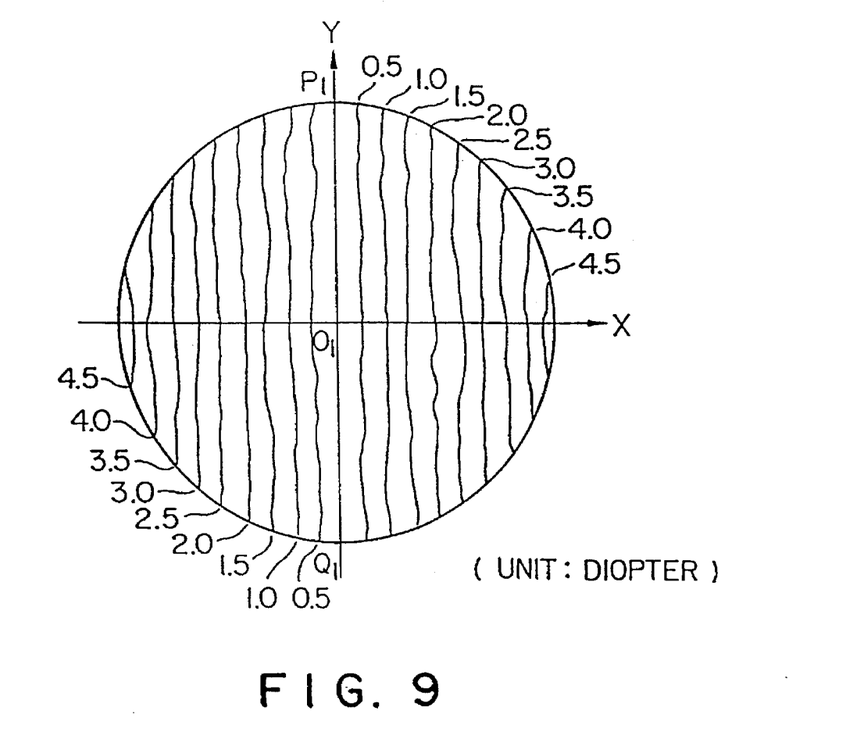
FIG. 9 is an aberration diagram of an eyeglass lens (on the eye ball side) according to the present invention.
Figure 10:
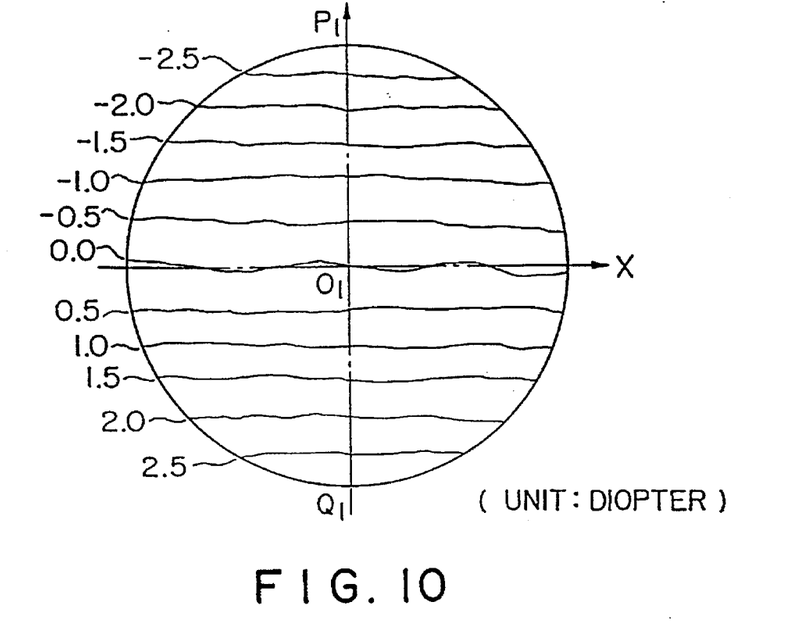
FIG. 10 is a diagram of power distribution of an eyeglass lens (on the eye ball side) of the present invention.

FIG. 9 is an aberration diagram, in which each of contours spaced at intervals of 0.5 diopter links points of same astigmatism in a lens on the eye ball side in an eyeglass lens in an embodiment of the present invention. Also, FIG. 10 is a diagram of power distribution of the lens, in which each of contours spaced at intervals of 0.5 diopter links points of same refracting power in the above lens. In FIG. 10 the refracting power becomes minimum at $P_1$ as −3.0 diopters and maximum at $Q_1$ as 3.0 diopters. If an additional power is defined as a difference between the refracting powers at $P_1$ and at $Q_1$, the eyeglass lens of the present invention shown in FIG. 10 has an additional power of 6.0 diopters.

Figure 11:
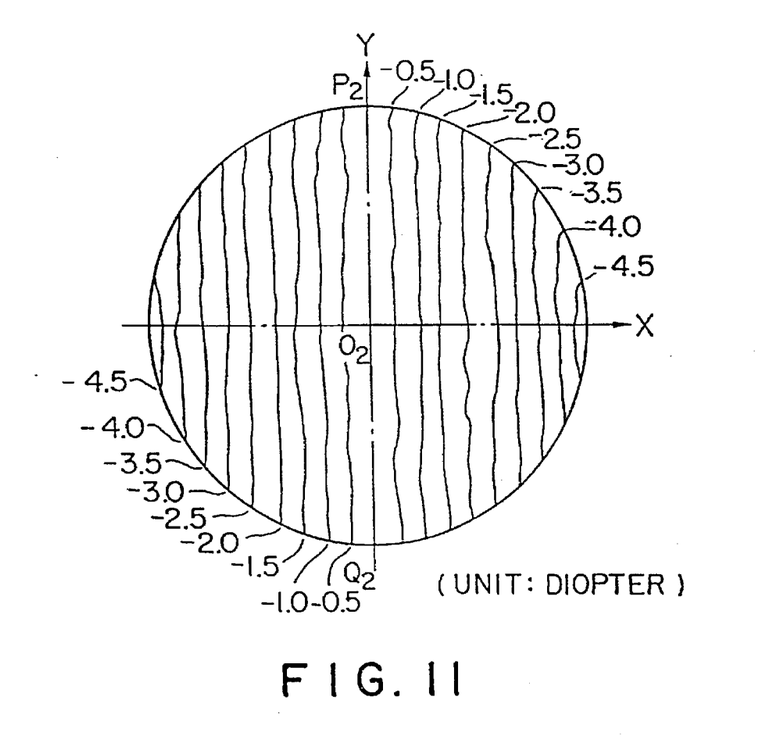
FIG. 11 is an aberration diagram of an eyeglass lens (on the object side)
Figure 12:
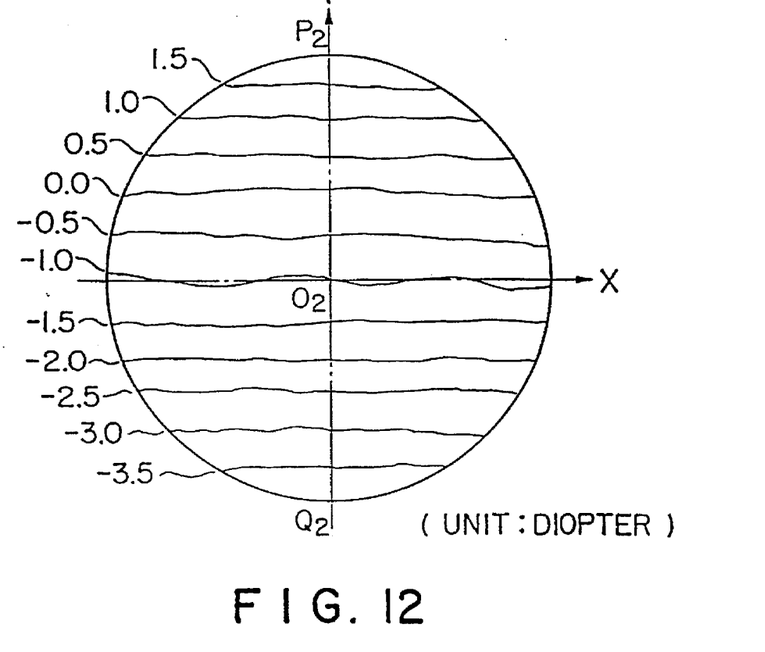
FIG. 12 is a diagram of power distribution of an eyeglass lens (on an object side) of the present invention.
Figures 13A, 13B:
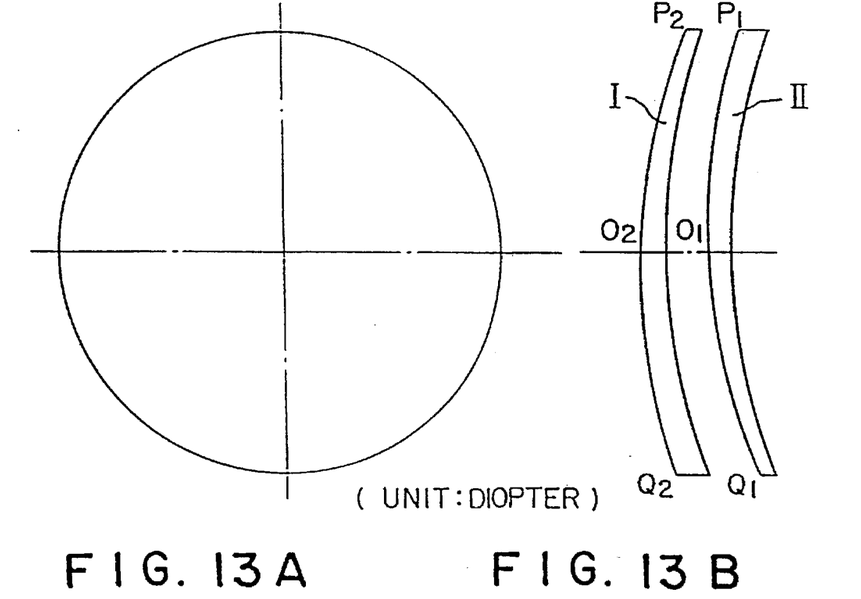
FIGS. 13(A) and 13(B) are aberration diagrams of variable focus type eyeglasses with slide mechanism using eyeglass lenses of the present invention.
Figures 14A, 14B:
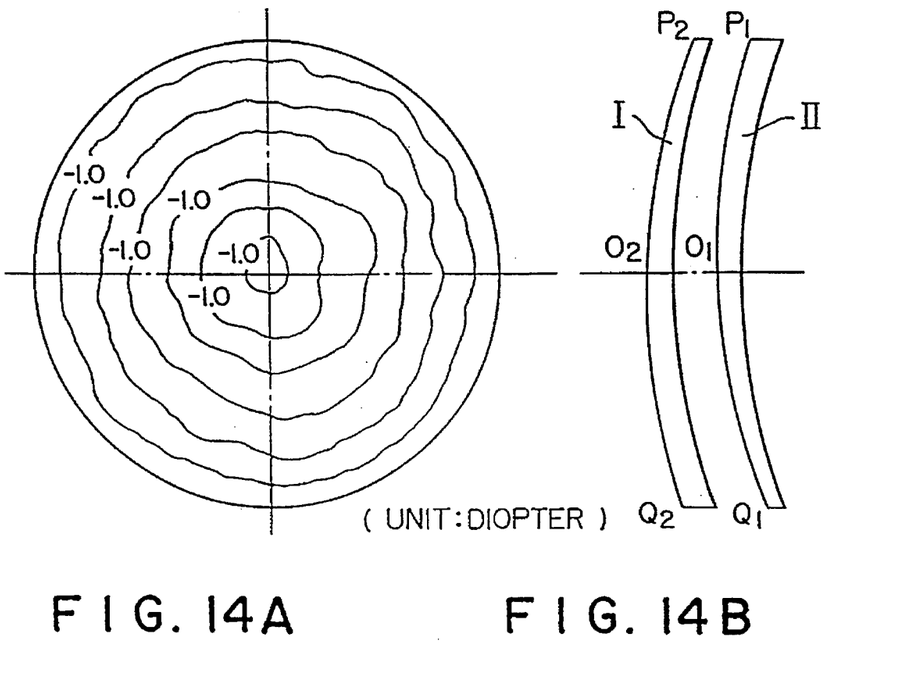
FIGS. 14(A) and 14(B) are diagrams of power distribution of variable focus type eyeglasses with slide mechanism using eyeglass lenses of the present invention.

Further, FIG. 11 is an aberration diagram of a lens on the object side in an eyeglass lens of the present invention, in which each of contours spaced at intervals of 0.5 diopter links points of same astigmatism. Also, FIG. 12 shows a power distribution of the lens, in which the refracting power becomes maximum at $P_2$ as 2.0 diopters and minimum at $Q_2$ as −4.0 diopters and in which an additional power is −6.0 diopters. In either of the aberration diagram and the power distribution diagram, values are progressively changing between the contours.

When two eyeglass lenses of the present invention as so designed are superimposed on each other such that the principal meridians of the lenses are parallel to each other while $O_1$ is coincident with $O_2$, as shown in Japanese Laid-open Patent Application No. 63-254415, a total aberration diagram and a total power distribution diagram in the superimposed region are as shown in FIGS. 13A to 14B, respectively. If the eyeglass lenses of the present invention are used in "variable focus type eyeglasses with slide mechanism", there is no astigmatism of not less than 0.5 diopter, as seen from FIG. 13A, and the entire superimposed region has a constant refracting power, specifically −1.0 diopter, as shown in FIG. 14A. This means that the optical performance of the thus obtained lens is identical to that of single-focal lens with −1.0 diopter. Although FIG. 14A shows the contours appearing complicated, the entire superimposed region actually has a constant refracting power and therefore the figure is drawn as shown because there is no slope of refracting power at all.

Figure 15:
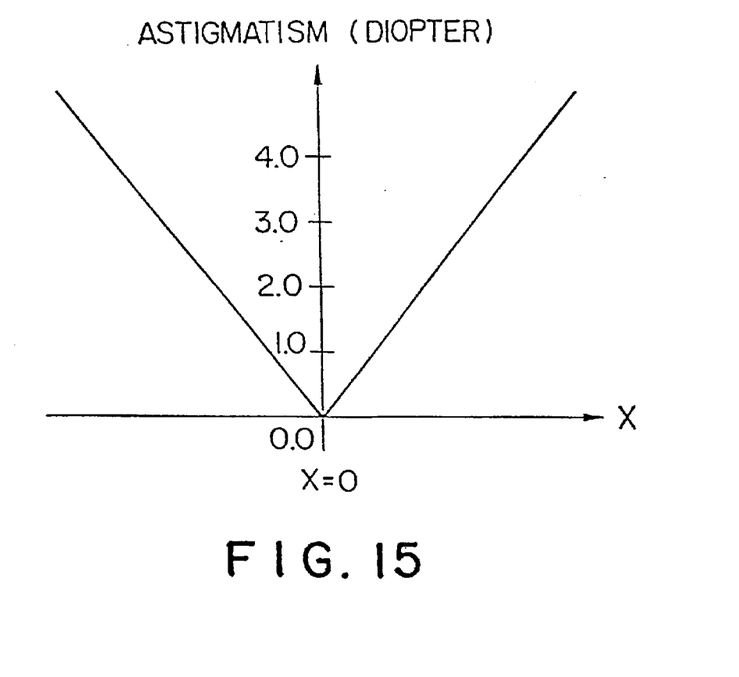
FIG. 15 is a diagram of astigmatism change on a meridian perpendicular to the principal meridian of an eyeglass lens (on the eye ball side) of the present invention.
Figure 16:
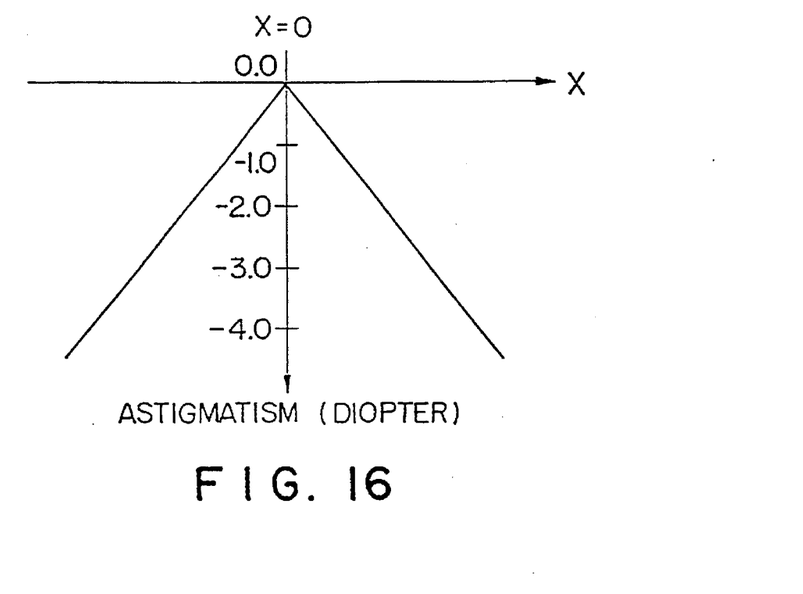
FIG. 16 is a diagram of astigmatism change on a meridian perpendicular to the principal meridian of an eyeglass lens (on the object side) of the present invention.
Figure 17:
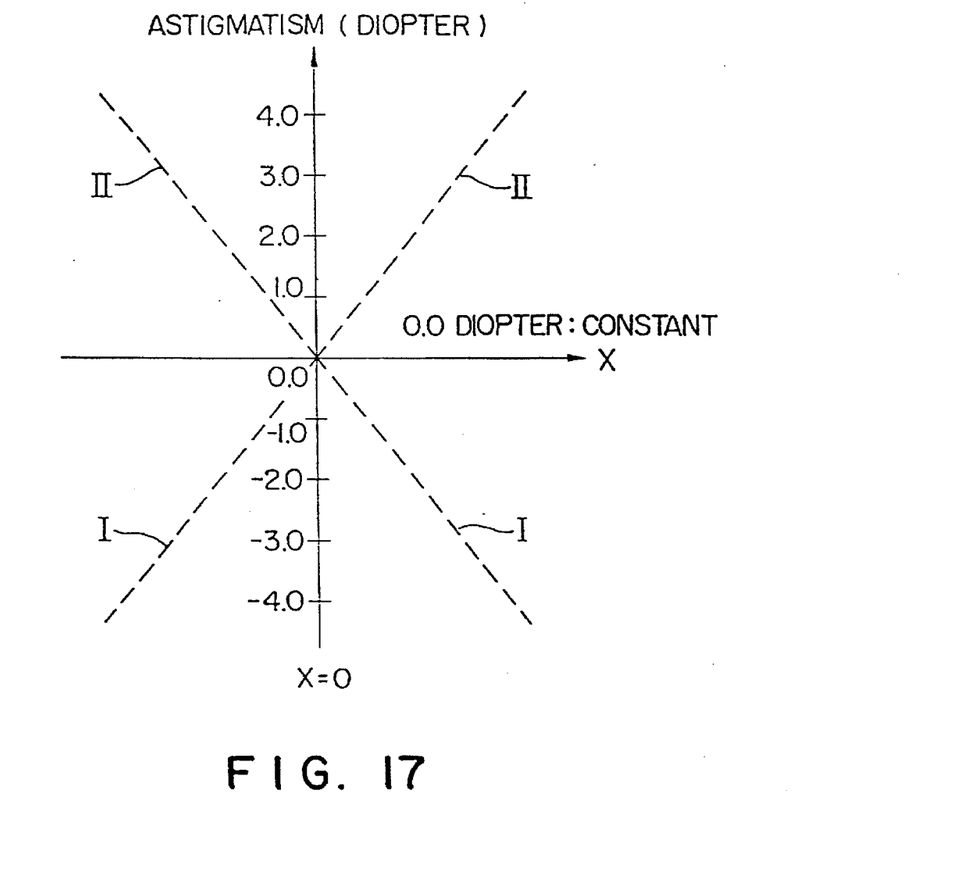
FIG. 17 is a diagram of astigmatism change on a meridian perpendicular to the principal meridian of variable focus type eyeglasses with slide mechanism using eyeglass lenses of the present invention.
Figure 18:
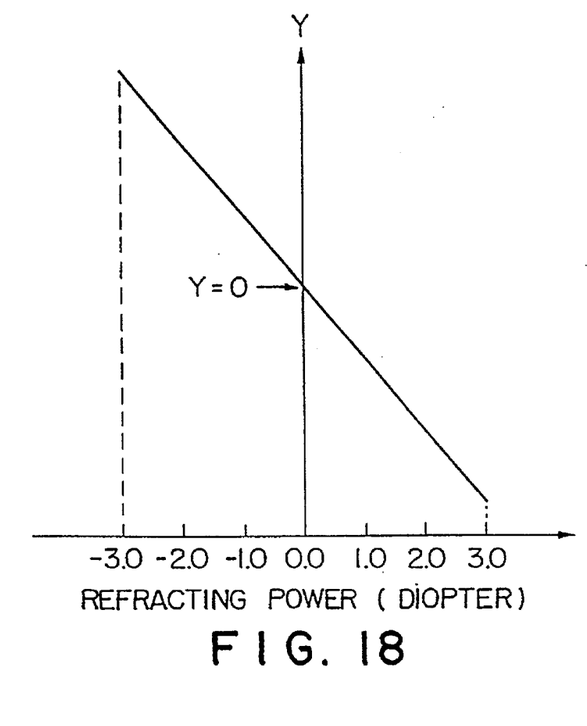
FIG. 18 is a diagram of change in refracting power on the principal meridian of an eyeglass lens (on the eye ball side) of the present invention.
Figure 19:
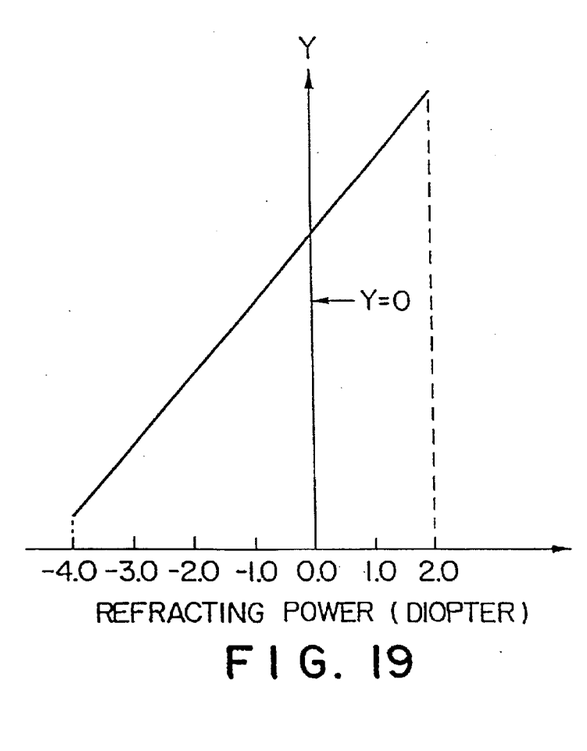
FIG. 19 is a diagram of change in refracting power on the principal meridian of an eyeglass lens (on the object side) of the present invention.
Figure 20:
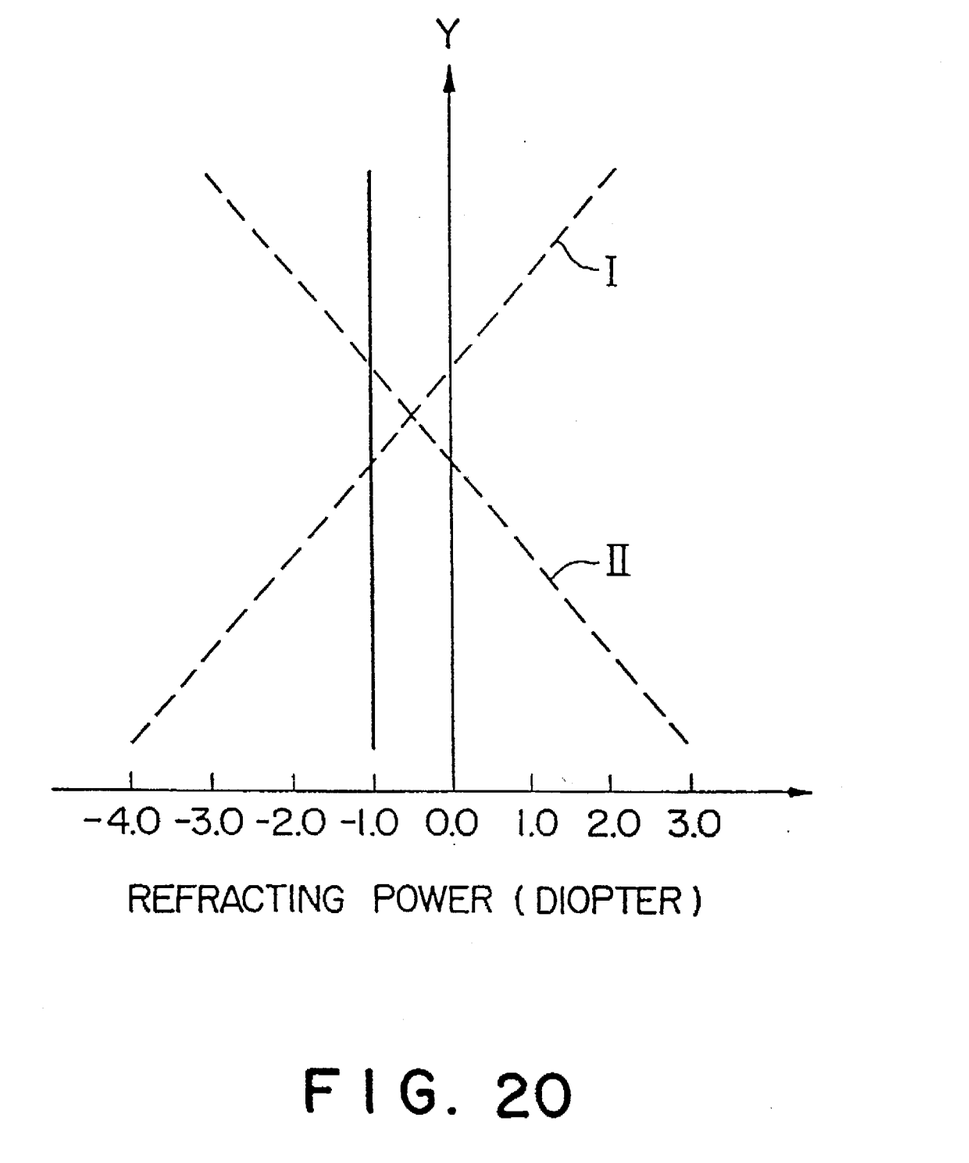
FIG. 20 is a diagram of change in refracting power on the principal meridian of variable focus type eyeglasses with slide mechanism using eyeglass lenses of the present invention.

The above relation can be explained as follows. Defining in the eyeglass lens of the present invention on the eye ball side as the principal meridian is on the Y axis, as an axis perpendicular to the Y axis is the X axis, and as an arbitrary constant is a (provided $P_1 > a > Q_1$), as shown in FIG. 9, a relation between X coordinate and astigmatism at Y=a is as shown in FIG. 15. Similarly, FIG. 16 shows a relation between X coordinate and astigmatism in the eyeglass lens of the present invention on the object side. Since the orientation of astigmatism in FIG. 16 is rotated by 180 degrees to the orientation of astigmatism in FIG. 15, the degree of astigmatism is taken in the negative direction in FIG. 16. When these eyeglass lenses of the present invention are superimposed on each other as in the above example, the astigmatic components in FIG. 15 and in FIG. 16 are combined with each other, so that the total astigmatism becomes constant at 0.0 diopter as shown in FIG. 17. This relation holds in the entire region where the eyeglass lenses of the present invention are superimposed on each other. This is the case as to the refracting power. Let an arbitrary constant be b. With X=b, FIG. 18 shows a relation between Y coordinate and refracting power of an eyeglass lens of the present invention on the eye ball side, and FIG. 19 shows a relation between Y coordinate and refracting power of an eyeglass lens of the present invention on the object side. When these lenses are superimposed on each other as in the above example, the total refracting power is a combination of FIG. 18 with FIG. 19, which is constant at −1.0 diopter as shown in FIG. 20. This relation also holds in the entire region where the eyeglass lenses of the present invention are superimposed on each other, similarly as in that of astigmatism.

Next from this state, the eyeglass lens of the present invention on the object side is slid in parallel with the Y axis for example. The mechanism for sliding may be the method as shown in Japanese Laid-open Patent Application No. 2-296212. The aforementioned relation always hold regardless of a slide amount for the total astigmatism of two eyeglass lenses in the region where the eyeglass lenses of the present invention are superimposed on each other, keeping it zero. Additionally, the refracting power can be changed in proportion to the slide amount while being kept equal on the entire superimposed region. Accordingly, a user of the "variable focus type eyeglasses with slide mechanism" using the eyeglass lenses of the present invention can arbitrarily adjust the refracting power with a field as wide as that in the single-focal lens.

It is preferable in the eyeglass lenses of the present invention that an absolute value of a slope of refracting power on the principal meridian of a lens on the eye ball side is equal to an absolute value of a slope of refracting power on the principal meridian of a lens on the object side. Amplitude of additional power and refracting powers at points $P_1$, $P_2$, $Q_1$ and $Q_2$ in each eyeglass lens of the present invention should be determined case by case depending upon the prescription of each user of the "variable focus type eyeglasses with slide mechanism", and therefore the invention is not limited to the values as shown in the above example. Further, it is needless to mention that the present invention includes all arrangements in which in aberration diagram and in power distribution diagram contours of astigmatism are substantially linear and parallel to the principal meridian and contours of refracting power are substantially linear and perpendicular to the principal meridian, regardless of the number, the spacing and the absolute values of contours.

Figure 21:
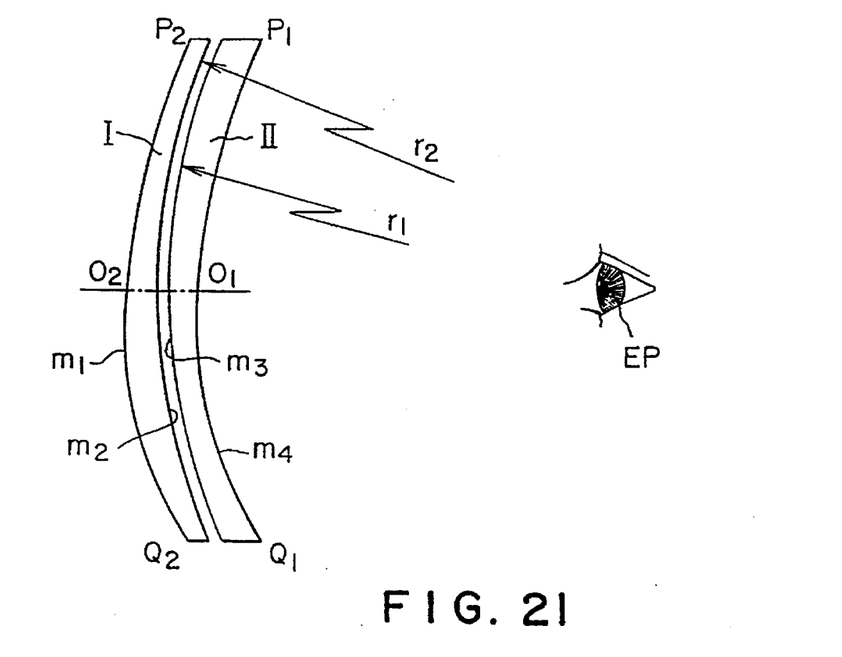
FIG. 21 is a cross section of an eyeglass lens of the present invention along the principal meridian.

The following method can be employed to produce more compact "variable focus type eyeglasses with slide mechanism" using the eyeglass lenses of the present invention. Namely, in FIG. 21, an eyeglass lens of the present invention on the eye ball side is represented by II and an eyeglass lens on the object side by I. The both lenses I and II are shown by a cross section along the principal meridian. An eye ball is denoted by EP. Further, m1 denotes a refractive surface of lens I on the object side, m2 a refractive surface thereof on the eye ball side, m3 a refractive surface of lens II on the object side, and m4 a refractive surface thereof on the eye ball side. It is better to set as small clearance as possible between the lens I and lens II in order to make the lens system compact. Then in FIG. 21, the refractive surface m2 and the refractive surface m3 are produced as spherical surfaces having an identical radius of curvature and including no astigmatic components, and a surface having a progressive zone (as will be referred to as progressive plane) is arranged on each of m1 and m2. As so arranged, the clearance may be reduced to the extreme between the lens I and the lens II. If the radii of curvature of the refractive surface m2 and the refractive surface m3 are r2 (mm) and r1 (mm), respectively, they do not necessarily have to satisfy a relation r1=r2, but may be any combination satisfying the following relation, which can assure the same effect.

$$|1/r1 - 1/r2| \leq 0.003$$

This reason is next explained with reference to FIG. 22 and FIG. 23.

Figure 22:
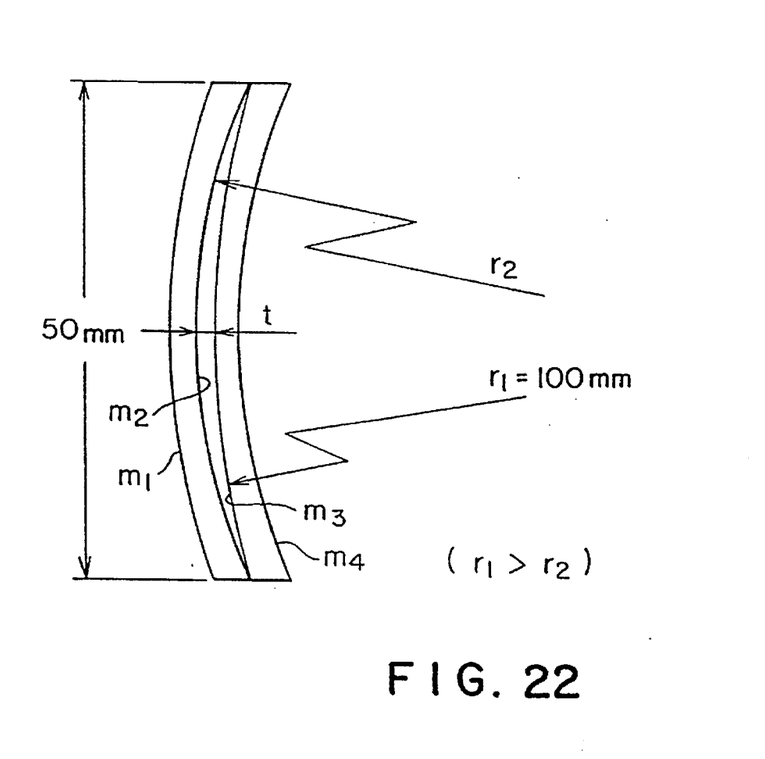
FIG. 22 is a cross section of an eyeglass lens of the present invention along the principal meridian.
Figure 23:
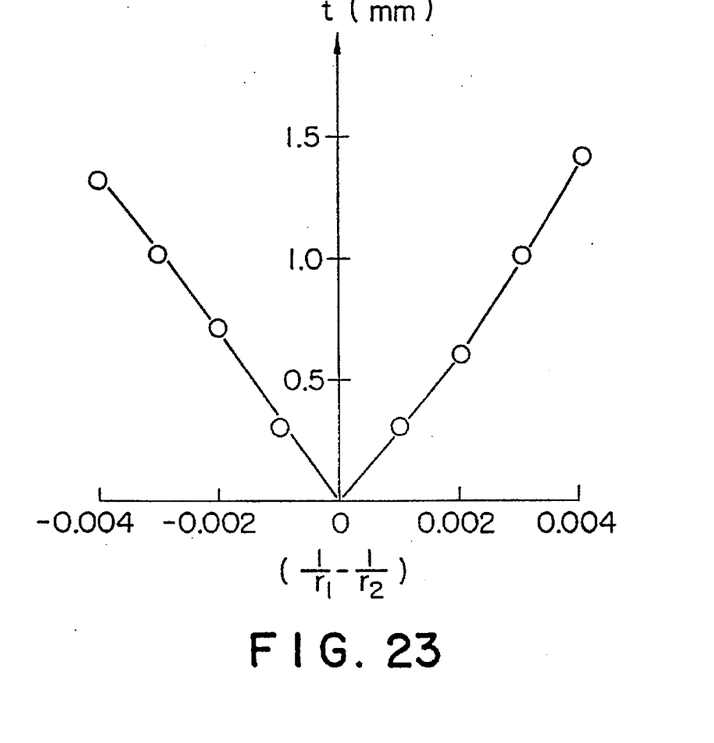
FIG. 23 is a diagram of a relation between a maximum clearance and a difference between curvatures of superimposed refractive planes.

FIG. 22 is a cross section of an eyeglass lens of the present invention along the principal meridian, in which a maximum clearance is shown by t with e1>r2. If r1>r2, the maximum clearance t appears at the outermost periphery of eyeglass lens. As the difference between the radii of curvature r1 and r2 increases, the maximum clearance t becomes larger. FIG. 23 shows a relation between the maximum clearance t and the difference of curvature between the refractive surface m3 and the refractive surface m2, that is, 1/r1−1/r2, in an example with the length of principal meridian being 50 (m/n) and r1 being 100 (mm), which are general dimensions when the eyeglass lenses of the present invention are actually used in "variable focus type eyeglasses with slide mechanism". In FIG. 23, the maximum clearance t becomes not less than 1 (mm) if the difference of curvature is out of the range between ±0.003. When t=0, the lens system in "variable focus type eyeglasses with slide mechanism" becomes most compact. However, the advantage of the present invention can be also enjoyed without any influence at sight if the maximum clearance t is within 1 (mm).

In this case, the point is the treatment of prescription of astigmatism, which could be addition of predetermined curvature for astigmatism to either progressive plane of m1 or m4.

Further, in FIG. 21, the progressive planes m1 and m4 reduce their radii of curvature toward $Q_2$ and $Q_1$, respectively. Therefore, if a prism with a base to $Q_2$ is inserted to the lens I or if a prism with a base to $P_1$ is inserted to the lens II, this lens system can be further miniaturized.

Figure 24:
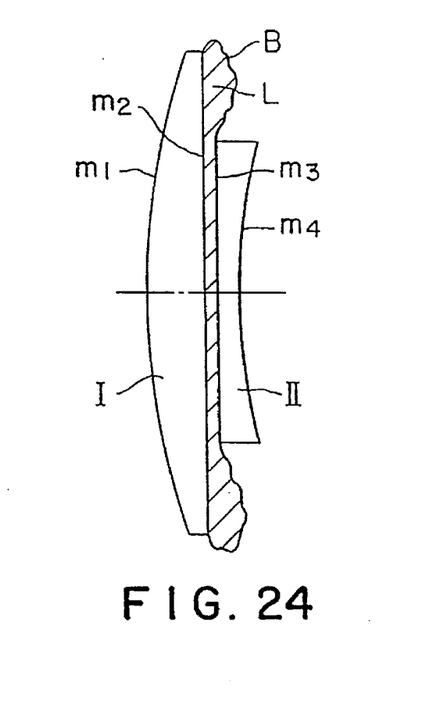
FIG. 24 is a cross section along the principal meridian to show an arrangement in which a liquid is confined between two optical lenses.

In the "variable focus type eyeglasses with slide mechanism", the adjustment of focal length is carried out by sliding two or more lenses relative to each other, so that the constituent lenses are likely to rub against each other to Rake flaws thereon. Then, as shown in an example of FIG. 24, water, oil or the like may be confined between the eyeglass lens on the object side and the eyeglass lens on the eye ball side. Then, the friction is reduced when the eyeglass lenses rub against each other, resulting in increase of life of "variable focus type eyeglasses with slide mechanism." It was found from experience of trial by the people concerned that if there was a clearance present between the refractive surfaces m2 and m3 the diffused reflection was strong, which was very cumbersome in use. If the clearance is filled with a liquid having the same index of refraction as that of the eyeglass lenses in FIG. 24, the refractive surfaces m2 and m3 can be considered as if absent, whereby the inconvenience may be overcome.

Figure 25:
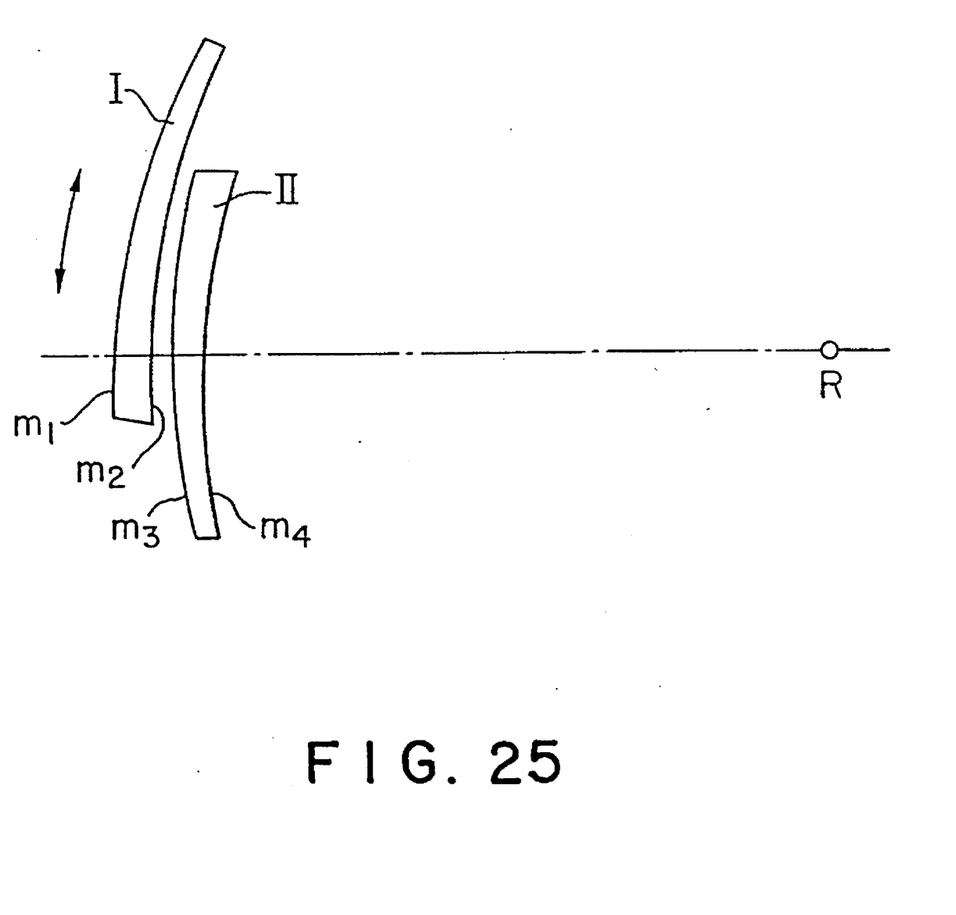
FIG. 25 is a cross section along the principal meridian to show a state when a lens I is rotated about the center of curvature R.

In the description of the above embodiments, the lenses are described as to move linearly and in parallel with each other for easy understanding of the contents. However, the two lenses may be slid relative to each other by rotating one of the two superimposed lenses relative to the other about the center of curvature of a lens surface as a rotation center. In this case, if the center R of curvature of the curved surfaces m2 and m3 in the two lenses I and II is set at the rotation center in FIG. 25, a change amount of clearance is small between the two curved surfaces when the lens is moved. Accordingly, the clearance can be set smaller, whereby the apparatus can be miniaturized.

Although the embodiments are described as each lens in "variable focus type eyeglasses with slide mechanism" is composed of two constituent lenses, each lens could be composed of three or more constituent lenses. Further, the eyeglass lenses according to the present invention are not limited to the applications in "variable focus type eyeglasses with slide mechanism", but may be applicable of course within the present invention to all applications in which the eyesight is corrected using the eyeglass lenses of the present invention. As described above, the eyeglass lenses of the present invention can nullify the astigmatism in "variable focus type eyeglasses with slide mechanism" and make the refracting power constant in the region where the eyeglass lenses of the present invention are superimposed on each other, whereby the lenses can have the optical performance identical to that of single focal lens.

According to the eyeglass lenses of the present invention, the lens system may be miniaturized in "variable focus type eyeglasses with slide mechanism", and the diffused reflection may be prevented in the arrangement in which a plurality of refractive surfaces are present.

According to the eyeglass lenses of the present invention, flaws, which could be caused when the eyeglass lenses rub against each other, may be effectively prevented so as to increase the life of "variable focus type eyeglass lenses with slide mechanism".

Industrial Application

As described above, the variable focus eyesight correcting apparatus according to the present invention is suitable for correction of presbyopia.

We claim:

1. An optical lens system for a variable focus eyesight correcting apparatus, the optical lens system comprising:

first and second optical lenses (I,II) superimposed on each other such that principal meridians thereof are coincident, the optical lenses being relatively slidable along the principal meridian for changing a refractive power, at least one of the opposite refractive surfaces ($m_1$–$m_2$) of each of the optical lenses having a region in which a radius of curvature and, thereby, optical power progressively changes along the principal meridians, wherein:

when astigmatisms in the optical lenses are expressed by contours space at interval of arbitrary diopter, the contours are substantially parallel to the principal meridians and substantially linear, the astigmatisms of the optical lenses compensating for each other so as to provide a low constant total astigmatism over an effective surface of the optical lenses; and when refracting powers in the optical lenses are expressed by contours spaced at intervals of arbitrary diopter, the contours are substantially perpendicular to the principal meridians and substantially linear, the refracting powers of the optical lenses compensating for each other so as to provide a variable but locally constant power over the entire effective surface.

2. The optical lens system according to claim 1, wherein, when a region of progressively changing radius of curvature is present on a refractive surface on an object side of one of the optical lenses (I,II), a prism is between the optical lenses such that a base of the prism is located on a side on the one of the optical lenses with a smaller radius of curvature in the region.

3. The optical lens system according to claim 1, wherein, when a region of progressively changing radius of curvature is present on a refractive surface on an eye ball side of one of the optical lenses (I,II), a prism is between the optical lenses such that a base of the prism is located on a side of the one of the optical lenses with a larger radius of curvature in the region.

4. The optical lens system according to claim 1, wherein, when the optical lens (I,II) are superimposed on each other, there is a clearance between the superimposed optical lenses and further comprising a fluid having an arbitrary index of refraction filling the clearance.

5. The optical lens system according to claim 1, wherein, when the optical lens (I,II) are superimposed on each other and a radius of curvature r1 (mm) for an eye ball side refractive surface of superimposed refractive surfaces of the optical lenses, a radius of curvature r2 (mm) for an object side refractive surface meets the following relation:

$$|1/r1 - 1/r2| \leq 0.003.$$

\* \* \* \* \*